(12) United States Patent
Frota De Souza et al.

(10) Patent No.: US 9,643,264 B2
(45) Date of Patent: May 9, 2017

(54) COUPLING MECHANISM FOR CUTTING TOOL

(71) Applicant: Kennametal Inc., Latrobe, PA (US)

(72) Inventors: Ruy Frota De Souza, Latrobe, PA (US); Leonid B. Sharivker, Naharia (IL); Sergei Boulakhov, Naharia (IL); Christoph Gey, Zirndorf (DE); Yosi Harush, Kiryat Mozkin (IL); Alan Bookheimer, Greensburg, PA (US); Uzi Levy, Kibbutz Matzuva (IL); Stephen Michael George, Greensboro, NC (US)

(73) Assignee: KENNAMETAL INC., Latrobe, PA (US)

( * ) Notice: Subject to any disclaimer, the term of this patent is extended or adjusted under 35 U.S.C. 154(b) by 180 days.

(21) Appl. No.: 13/950,407

(22) Filed: Jul. 25, 2013

(65) Prior Publication Data

US 2015/0030398 A1    Jan. 29, 2015

(51) Int. Cl.
*B23B 31/11* (2006.01)
*B23C 5/10* (2006.01)
(Continued)

(52) U.S. Cl.
CPC ............. *B23C 5/109* (2013.01); *B23B 51/00* (2013.01); *B23C 5/10* (2013.01); *B23B 31/11* (2013.01);
(Continued)

(58) Field of Classification Search
CPC ....... Y10T 408/9098; Y10T 408/90993; Y10T 408/94; Y10T 408/95; Y10T 408/957;
(Continued)

(56) References Cited

U.S. PATENT DOCUMENTS

| 756,339 A | 4/1904 | Down |
|---|---|---|
| 1,083,747 A | 1/1914 | Kocher |

(Continued)

FOREIGN PATENT DOCUMENTS

| CH | 238003 A | 9/1945 |
|---|---|---|
| CN | 104001980 A | 8/2014 |

(Continued)

OTHER PUBLICATIONS

Jul. 30, 2015 International Search Report Received PCTUS2015029408.

(Continued)

*Primary Examiner* — Daniel Howell
*Assistant Examiner* — Nicole N Ramos
(74) *Attorney, Agent, or Firm* — Ian K. Samways

(57) ABSTRACT

A rotary cutting tool includes a cutter of generally cylindrical shape disposed about a central longitudinal axis. The cutter has a first end having an active fluted portion and an opposite second end, the second end having a male threaded portion disposed thereabout. The cutting tool further includes a shank of generally cylindrical shape disposed about the central longitudinal axis, the shank having a recessed female threaded portion formed in a first end. The male threaded portion includes a number of threads disposed at a first pitch and the female threaded portion includes a number of threads disposed at a second pitch different than the first pitch. The cutter and the shank are selectively coupled via threaded engagement of the male threaded portion and the female threaded portion.

18 Claims, 7 Drawing Sheets

(51) Int. Cl.
  *B23B 51/00*   (2006.01)
  *F16B 39/30*   (2006.01)

(52) U.S. Cl.
  CPC ....... *B23B 2251/02* (2013.01); *B23C 2210/02* (2013.01); *B23C 2210/03* (2013.01); *B23C 2240/32* (2013.01); *F16B 39/30* (2013.01); *Y10T 407/1906* (2015.01); *Y10T 408/907* (2015.01); *Y10T 408/9098* (2015.01)

(58) Field of Classification Search
  CPC ......... Y10T 407/1946; Y10T 407/1948; Y10T 409/30952; Y10T 279/16; B23B 31/11; B23B 31/1107; B23B 31/1115; B23B 31/1122; B23C 2210/03; B23C 2210/02; F16B 39/30
  USPC ......... 407/53, 54; 408/231, 233, 238, 239 R, 408/239 A; 409/234; 279/8, 99; 411/307
  See application file for complete search history.

(56) References Cited

U.S. PATENT DOCUMENTS

| | | | |
|---|---|---|---|
| 1,191,717 A | 7/1916 | Moore | |
| 1,354,097 A | 9/1920 | Fitzsimmons | |
| 1,407,335 A | 2/1922 | Reynolds | |
| 1,615,233 A | 1/1927 | Redinger | |
| 1,881,024 A | 10/1932 | Lang | |
| 1,919,553 A | 7/1933 | Hawthorne | |
| 2,079,692 A | 5/1937 | Lapointe | |
| 2,158,120 A | 5/1939 | Hirschberg | |
| 2,328,602 A | 9/1943 | Bechler | |
| 2,367,841 A | 1/1945 | Monroe | |
| 2,532,632 A | 12/1950 | MacArthur | |
| 2,745,685 A | 5/1956 | Moore | |
| 3,047,316 A | 7/1962 | Wehring et al. | |
| 3,061,025 A | 10/1962 | Stockard, Jr. | |
| 3,153,356 A | 10/1964 | Dearborn | |
| 3,304,816 A | 2/1967 | Galorneau | |
| 3,304,818 A | 2/1967 | Heaton | |
| 3,326,581 A | 6/1967 | Wong | |
| 3,454,070 A * | 7/1969 | Phipard, Jr. | 411/168 |
| 3,521,507 A | 7/1970 | Yogus et al. | |
| 3,582,117 A | 6/1971 | Lundstrom | |
| 3,586,353 A | 6/1971 | Lorenz et al. | |
| 3,876,319 A | 4/1975 | Meyer | |
| 3,933,210 A | 1/1976 | Skidmore | |
| 3,945,446 A | 3/1976 | Ostertag et al. | |
| 4,113,290 A | 9/1978 | Miida | |
| 4,158,973 A | 6/1979 | Schumacher, Jr. et al. | |
| 4,262,400 A | 4/1981 | Miesch | |
| 4,295,751 A | 10/1981 | Holmberg | |
| 4,332,502 A | 6/1982 | Wormald et al. | |
| 4,438,953 A | 3/1984 | Timme, Jr. | |
| 4,489,963 A | 12/1984 | Raulins et al. | |
| 4,521,042 A | 6/1985 | Blackburn et al. | |
| 4,548,431 A | 10/1985 | Hall et al. | |
| 4,629,222 A | 12/1986 | Dearden et al. | |
| 4,688,832 A | 8/1987 | Ortloff et al. | |
| 4,748,879 A | 6/1988 | Von Haas | |
| 4,828,294 A | 5/1989 | Bounie et al. | |
| 4,842,464 A * | 6/1989 | Green | 411/307 |
| 4,923,344 A | 5/1990 | Bieri | |
| 4,955,644 A | 9/1990 | Pfeiffer et al. | |
| 4,961,469 A | 10/1990 | Larsson et al. | |
| 4,984,829 A | 1/1991 | Saigo et al. | |
| 5,114,286 A | 5/1992 | Calkins | |
| 5,169,183 A | 12/1992 | Hallez | |
| 5,238,335 A | 8/1993 | Nomura | |
| 5,415,243 A | 5/1995 | Lyon et al. | |
| 5,492,375 A | 2/1996 | Smith | |
| 5,496,137 A | 3/1996 | Ochayon et al. | |
| 5,598,751 A | 2/1997 | Ochayon et al. | |
| 5,607,263 A | 3/1997 | Nespeta | |
| 5,624,213 A | 4/1997 | Anderson | |
| 5,647,447 A | 7/1997 | Jones | |
| 5,672,037 A * | 9/1997 | Iwata | F16B 39/30 411/311 |
| 5,695,304 A | 12/1997 | Ebert | |
| 5,699,867 A | 12/1997 | Jones | |
| 5,788,401 A | 8/1998 | Drenth | |
| 5,810,401 A | 9/1998 | Mosing et al. | |
| 5,863,162 A | 1/1999 | Karlsson et al. | |
| 5,873,687 A | 2/1999 | Watanabe | |
| 5,899,642 A | 5/1999 | Berglow et al. | |
| 5,947,660 A | 9/1999 | Karlsson et al. | |
| 5,971,670 A | 10/1999 | Pantzar et al. | |
| 5,984,030 A | 11/1999 | Larsson et al. | |
| 6,012,881 A | 1/2000 | Scheer | |
| 6,030,004 A | 2/2000 | Schock et al. | |
| 6,086,291 A | 7/2000 | Hansson et al. | |
| 6,109,841 A | 8/2000 | Johne | |
| 6,120,067 A | 9/2000 | Mosing et al. | |
| 6,158,785 A | 12/2000 | Beaulier | |
| 6,241,433 B1 | 6/2001 | Rydberg | |
| 6,244,631 B1 | 6/2001 | Payne et al. | |
| 6,276,879 B1 | 8/2001 | Hecht | |
| 6,299,180 B1 | 10/2001 | Satran et al. | |
| 6,394,648 B1 | 5/2002 | Tseng | |
| 6,394,711 B1 | 5/2002 | Brosius | |
| 6,406,226 B2 | 6/2002 | Kojima | |
| 6,409,175 B1 | 6/2002 | Evans et al. | |
| 6,447,025 B1 | 9/2002 | Smith | |
| 6,485,061 B1 | 11/2002 | Mosing et al. | |
| 6,485,220 B2 | 11/2002 | Hecht | |
| 6,494,648 B2 | 12/2002 | Harpaz | |
| 6,517,123 B2 | 2/2003 | Nishio | |
| 6,524,034 B2 | 2/2003 | Eng et al. | |
| 6,551,035 B1 | 4/2003 | Bruhn et al. | |
| 6,565,291 B2 | 5/2003 | Harpaz et al. | |
| 6,626,614 B2 | 9/2003 | Nakamura | |
| 6,637,985 B2 | 10/2003 | Pokolm | |
| 6,767,156 B1 | 7/2004 | Larsson | |
| 6,783,308 B2 | 8/2004 | Lindblom | |
| 6,810,956 B1 | 11/2004 | Sandstrom | |
| 6,827,162 B2 | 12/2004 | Fisher | |
| 6,845,826 B1 | 1/2005 | Feld et al. | |
| 6,860,514 B2 | 3/2005 | Wentworth et al. | |
| 7,004,692 B2 | 2/2006 | Hecht | |
| 7,101,128 B2 | 9/2006 | Hansson | |
| 7,189,039 B2 | 3/2007 | Pantzar | |
| 7,210,710 B2 | 5/2007 | Williamson | |
| RE39,869 E | 10/2007 | Payne et al. | |
| 7,329,073 B2 | 2/2008 | Jonsson et al. | |
| 7,341,409 B2 | 3/2008 | Jonsson et al. | |
| 7,374,376 B2 | 5/2008 | Jonsson et al. | |
| 7,407,351 B2 | 8/2008 | Pantzar et al. | |
| 7,431,543 B2 | 10/2008 | Buettiker et al. | |
| 7,478,978 B2 | 1/2009 | Jonsson et al. | |
| 7,513,724 B2 | 4/2009 | Kakai | |
| D602,511 S | 10/2009 | Sandoval et al. | |
| 7,611,311 B2 | 11/2009 | Kakai et al. | |
| 7,624,822 B2 | 12/2009 | Olsson et al. | |
| 7,713,004 B2 | 5/2010 | Lehto et al. | |
| 7,775,287 B2 | 8/2010 | Duggan et al. | |
| 7,980,795 B2 | 7/2011 | Berglow et al. | |
| 8,066,307 B2 | 11/2011 | Wahlstrom et al. | |
| 8,226,333 B2 | 7/2012 | Kakai et al. | |
| 8,245,798 B2 | 8/2012 | Nava et al. | |
| 8,262,139 B2 | 9/2012 | Nava | |
| 8,286,972 B2 | 10/2012 | Haimer | |
| 8,312,615 B2 | 11/2012 | Frota de Souza Filho | |
| 8,366,119 B2 | 2/2013 | Rimet | |
| 8,408,848 B2 | 4/2013 | Hecht | |
| 8,556,550 B2 | 10/2013 | Lutz et al. | |
| 8,662,800 B2 | 3/2014 | Guay | |
| 8,668,413 B2 | 3/2014 | Volokh | |
| 8,690,500 B2 | 4/2014 | Spichtinger et al. | |
| 2001/0041089 A1 | 11/2001 | Hecht | |
| 2002/0021945 A1* | 2/2002 | Harpaz | B23B 31/11 407/53 |
| 2002/0159851 A1 | 10/2002 | Krenzer | |
| 2003/0021651 A1* | 1/2003 | Suzuki et al. | 411/307 |

(56) References Cited

U.S. PATENT DOCUMENTS

| | | |
|---|---|---|
| 2003/0068209 A1 | 4/2003 | Leibhard |
| 2003/0210963 A1 | 11/2003 | Kakai et al. |
| 2004/0208716 A1 | 10/2004 | Krenzer |
| 2005/0129477 A1 | 6/2005 | Pantzar |
| 2006/0062642 A1 | 3/2006 | Jonsson |
| 2006/0072977 A1 | 4/2006 | Jonsson |
| 2006/0073744 A1 | 4/2006 | Jonsson |
| 2006/0257215 A1 | 11/2006 | Kakai |
| 2007/0116539 A1 | 5/2007 | Malik et al. |
| 2007/0248421 A1* | 10/2007 | Kakai et al. .................. 407/34 |
| 2009/0010709 A1 | 1/2009 | Berglow et al. |
| 2010/0123311 A1 | 5/2010 | Church |
| 2011/0013999 A1 | 1/2011 | Moseley et al. |
| 2011/0211921 A1 | 9/2011 | Volokh |
| 2011/0280683 A1 | 11/2011 | Galipaud |
| 2011/0309588 A1 | 12/2011 | Heinloth et al. |
| 2012/0009027 A1 | 1/2012 | Sharivker et al. |
| 2012/0020749 A1 | 1/2012 | Maeda et al. |
| 2012/0093602 A1 | 4/2012 | Osawa et al. |
| 2012/0208147 A1 | 8/2012 | Krumsiek |
| 2013/0022415 A1 | 1/2013 | Osawa |
| 2013/0028669 A1 | 1/2013 | Cigni |
| 2013/0051935 A1 | 2/2013 | Schuffenhauer |
| 2013/0272806 A1 | 10/2013 | Guay |
| 2014/0056658 A1 | 2/2014 | Maeda |
| 2014/0360334 A1 | 12/2014 | Singer-Schnoeller |
| 2015/0016905 A1 | 1/2015 | Haimer |
| 2015/0151365 A1 | 6/2015 | Haimer |
| 2015/0202690 A1 | 7/2015 | Haimer |
| 2015/0217380 A1 | 8/2015 | Haimer |
| 2015/0360295 A1 | 12/2015 | Haimer |

FOREIGN PATENT DOCUMENTS

| | | |
|---|---|---|
| CN | 104001981 A | 8/2014 |
| DE | 1266613 B | 4/1968 |
| DE | 2 602 162 | 1/1986 |
| DE | 3912503 A1 | 3/1990 |
| DE | 202 02 053 U1 | 2/2002 |
| DE | 10 2005 012 025 A1 | 12/2006 |
| DE | 10 2012 100 976 B4 | 4/2014 |
| EP | 0 240 917 A2 | 1/1987 |
| EP | 0551540 A1 | 1/1992 |
| EP | 0 340 187 B1 | 1/1993 |
| EP | 0 771 934 A2 | 10/1996 |
| EP | 0 771 400 B1 | 5/2001 |
| EP | 0771934 B1 | 4/2003 |
| EP | 0 815 340 B1 | 5/2003 |
| EP | 0 897 504 B1 | 9/2003 |
| EP | 1 127 209 B1 | 5/2004 |
| EP | 1 232 321 B1 | 7/2004 |
| EP | 1 280 624 B1 | 1/2006 |
| EP | 1 847 345 B1 | 3/2007 |
| EP | 0 777 545 B2 | 7/2010 |
| EP | 2 418036 B1 | 7/2013 |
| FR | 1019411 | 6/1950 |
| FR | 1022682 | 7/1950 |
| FR | 2602162 | 4/1986 |
| GB | 191324122 | 10/1914 |
| GB | 765943 | 1/1957 |
| GB | 844212 | 8/1960 |
| JP | 62-188617 A | 8/1987 |
| JP | 2003011016 A | 1/2003 |
| JP | 2011161583 A * | 8/2011 |
| JP | 2012071391 A | 4/2012 |
| WO | 02076661 A1 | 10/2002 |
| WO | 03068436 A1 | 8/2003 |
| WO | WO 2006033616 A1 * | 3/2006 |
| WO | 2006050952 A1 | 5/2006 |
| WO | 2011/019105 A1 | 2/2011 |
| WO | 2011/138360 A1 | 11/2011 |
| WO | 2011138360 A1 | 11/2011 |
| WO | 2013/146882 A1 | 10/2013 |
| WO | 2014/026975 A1 | 2/2014 |
| WO | 2014118264 A1 | 8/2014 |
| WO | 2015032996 A1 | 3/2015 |

OTHER PUBLICATIONS

Jul. 30, 2015—Written Opinion.
Jun. 29, 2015 First office action.
Mar. 21, 2016 Office action.
Jun. 17, 2016 Office action.
Aug. 26, 2016 Final Office Action.
Nov. 17, 2016 International preliminary report on patentability received.
Nov. 17, 2016 International preliminary report on patentability receieved.

* cited by examiner

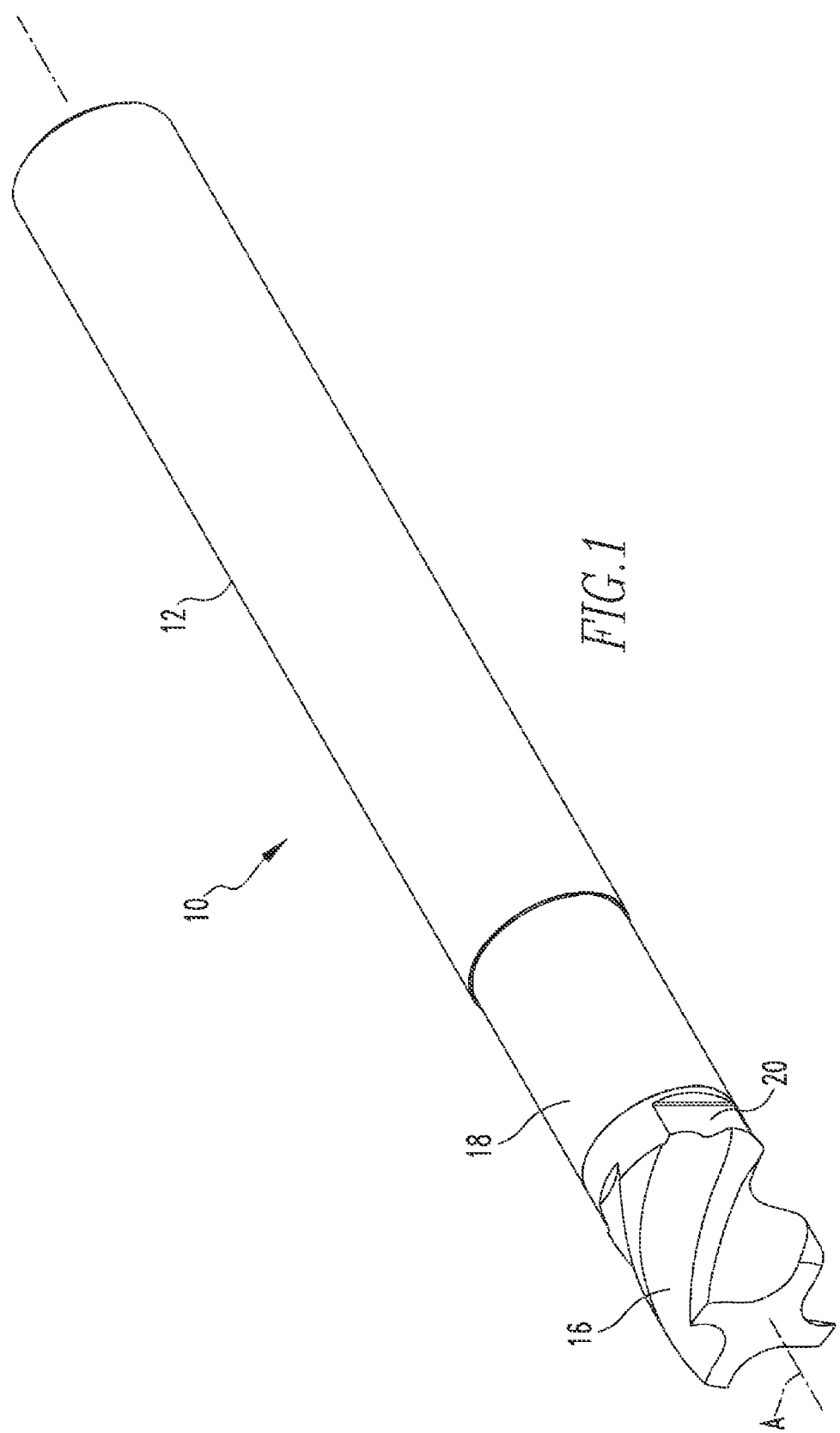

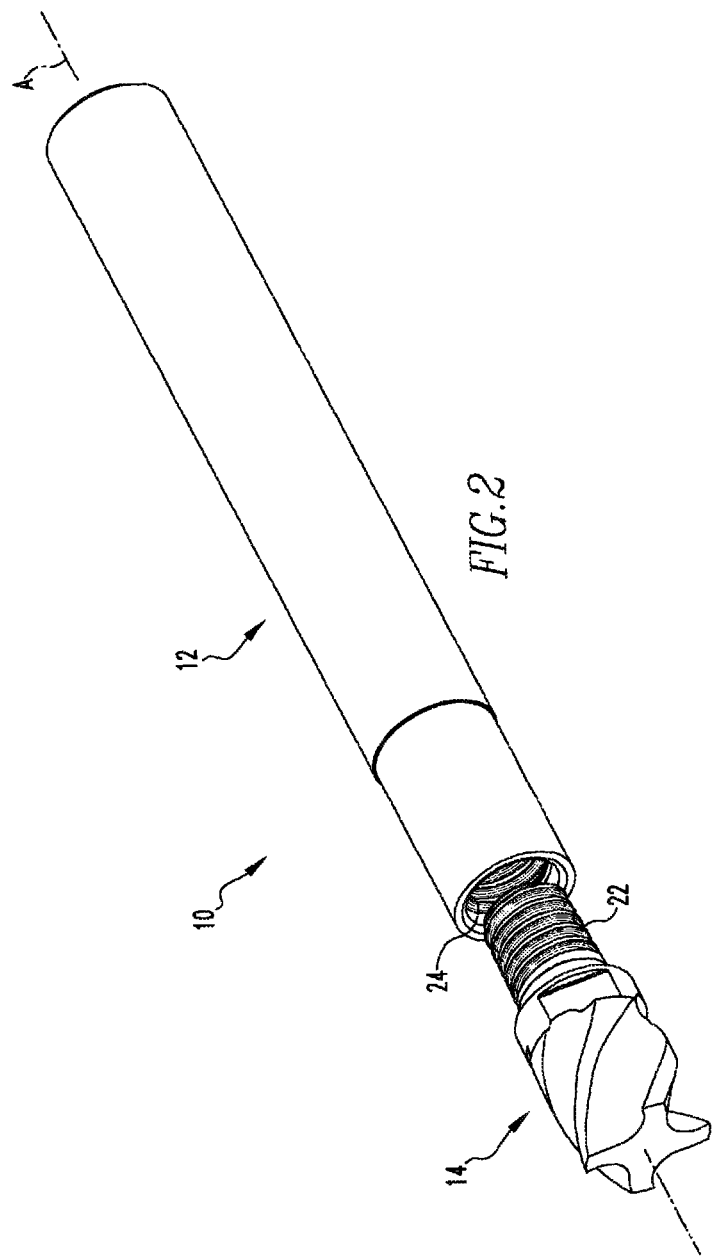

COUPLING MECHANISM FOR CUTTING TOOL

BACKGROUND

Field of the Invention

The present invention relates to coupling mechanisms for use with rotary cutting tools and, more particularly, to rotary cutting tools including such coupling mechanisms.

Background Information

Historically, end mills for metal cutting machinery were produced as a single unit, comprising a fluted cutting portion and a cylindrical or conical shank portion sized to fit a machine spindle. However, increasing global pricing of modern tool alloys along with recently developed intricate surface treatments have made such single units less economical, as the expensive shank material is generally wasted. It has therefore became common practice to produce a separate cutter made of high quality alloy or sintered carbide, which is then concentrically attached to the end of a reusable steel shank.

It is highly desirable that the cutter be easily replaced, upon wear, while leaving the shank in the machine spindle, such that no further adjustments are required after cutter replacement. A major requirement related to such accurate milling applications is that each replacement cutter be repeatedly, accurately, centered to the true spindle axis of rotation and axially positioned correctly.

One basic method currently in use for joining the cutter to the shank is disclosed for example in U.S. Pat. No. 5,114,286, which teaches an interchangeable cutting tool alignment and positioning system comprising a first tool segment having a male coupler and a second tool segment having a female coupler. The male coupler comprises a pilot in the form of first cylindrical mating surface, a concentric aligner in the form of second cylindrical mating surface spaced apart from the pilot, a male thread extending between the pilot and the concentric aligner and an axial stop in the form of planar surface. The female coupler comprises a pilot bore in the form of complementary cylindrical mating surface, corresponding to the cylindrical mating surface of the pilot, a concentric bore in the form of a complementary cylindrical mating surface corresponding to the cylindrical mating surface of the concentric aligner, a female thread extending between the pilot bore and the concentric bore, and an axial stop in the form of complementary planar surface.

The described pilot, concentric aligner, pilot bore and concentric bore, are necessary because the threaded coupler by its own is not sufficiently accurate for such repeated replacement of cutters.

Further improvements to the above basic concept are also known. For instance, U.S. Pat. No. 6,485,220 discloses a frustoconical radial alignment instead of a cylindrical alignment, as well as a strengthened thread root and U.S. Pat. No. 7,329,073 describes adjacent axial and radial stop surfaces.

Nevertheless all the above described solutions suffer from restrictive production requirements. Typical production tolerances of the cylindrical mating surfaces on the cutter and shank, sufficient for satisfying the need of replaceable cutters falling repeatedly in the desired range of concentricity and axis position, are less than 5 micrometers. Such close tolerances necessitate an additional grinding process.

Furthermore, sintered carbide cutters by their nature are very hard yet also very brittle. Direct coupling of the hard cutter to the steel shank imposes stresses on the coupling where the two different materials engage. More particularly, in cases where a carbide cutter is threaded into a steel shank, failure of the connection is likely to occur at or near the base of the threaded portion of the carbide cutter, which commonly also damages the steel shank, rendering it unsuitable for reuse.

Hence there is room for improvement in coupling mechanisms for use with rotary cutting tools and also to rotary cutting tools including such coupling mechanisms.

SUMMARY OF THE INVENTION

As one aspect of the present invention a rotary cutting tool is provided. The rotary cutting tool comprises a cutter of generally cylindrical shape disposed about a central longitudinal axis. The cutter includes a first end having an active fluted portion and an opposite second end, the second end having a male threaded portion disposed thereabout. The rotary cuting tool further comprises a shank of generally cylindrical shape disposed about the central longitudinal axis, the shank having a recessed female threaded portion formed in a first end. The male threaded portion includes a number of threads disposed at a first pitch and the female threaded portion includes a number of threads disposed at a second pitch different than the first pitch. The cutter and the shank are selectively coupled via threaded engagement of the male threaded portion and the female threaded portion.

The first pitch may be less than the second pitch.

The first pitch may be about 0.005 mm less than the second pitch.

The difference between the first pitch and the second pitch may be in the range of about 0.002 to about 0.010 mm.

The cutter may be formed from a carbide material and the shank may be formed from a tool steel.

The cutter may comprise an outward facing circumferential surface extending a distance along the central longitudinal axis disposed between the active fluted portion and the male threaded portion, the shank may comprise an inward facing circumferential surface extending a distance along the central longitudinal axis between the female threaded portion and the first end of the shank, and the outward facing circumferential surface may be disposed adjacent to, and facing the inward facing circumferential surface when the male threaded portion and the female threaded portion are threadedly engaged.

The outward facing circumferential surface may be generally in the form of a portion of a truncated cone disposed at a first angle with respect to the central longitudinal axis and the inward facing circumferential surface may be generally in the form of a portion of a truncated cone disposed at a second angle with respect to the central longitudinal axis.

The first angle may be in the range of about 1° to about 7°.

The second angle may be in the range of about 1° to about 7°.

The outward facing circumferential surface may be generally a cylindrical surface disposed parallel to the central longitudinal axis and the inward facing circumferential surface may be generally a cylindrical surface disposed parallel to the central longitudinal axis.

The cutter may comprise an outward facing circumferential surface extending a distance along the central longitudinal axis disposed adjacent the male threaded portion and opposite the active fluted portion, the shank may comprise an inward facing circumferential surface extending a distance along the central longitudinal axis adjacent the female threaded portion opposite the first end of the shank, and the outward facing circumferential surface may be disposed adjacent to, and facing the inward facing circumferential surface when the male threaded portion and the female threaded portion are threadedly engaged.

The outward facing circumferential surface may be disposed at an angle in the range of 0° to about 6° with respect to the central longitudinal axis.

The inward facing circumferential surface may be disposed within the range of 0° to 2° of the angle of the outward facing circumferential surface.

The cutter may comprise a first outward facing circumferential surface extending a distance along the central longitudinal axis disposed between the active fluted portion and the male threaded portion and a second outward facing circumferential surface extending a distance along the central longitudinal axis adjacent the male threaded portion and opposite the active fluted portion, the shank may comprise a first inward facing circumferential surface extending a distance along the central longitudinal axis between the female threaded portion and the first end of the shank and a second inward facing circumferential surface extending a distance along the central longitudinal axis adjacent the female threaded portion opposite the first end of the shank, the first outward facing circumferential surface may disposed adjacent to, and facing the first inward facing circumferential surface when the male threaded portion and the female threaded portion are threadedly engaged, and the second outward facing circumferential surface may be disposed adjacent to, and facing the second inward facing circumferential surface when the male threaded portion and the female threaded portion are threadedly engaged.

As another aspect of the present invention, a rotary cutting tool is provided. The rotary cutting tool comprises: a cutter of generally cylindrical shape disposed about a central longitudinal axis, the cutter having a first end having an active fluted portion and an opposite second end, the second end having a male threaded portion disposed thereabout; and a shank of generally cylindrical shape disposed about the central longitudinal axis, the shank having a recessed female threaded portion formed in a first end. The male threaded portion includes a number of threads disposed at a first pitch and at a first taper angle, the female threaded portion includes a number of threads disposed at a second pitch and at a second taper angle different than the first taper angle, and the cutter and the shank are selectively coupled via threaded engagement of the male threaded portion and the female threaded portion.

The first taper angle may be less than the second taper angle.

The first pitch may be equal to the second pitch or the first pitch may be less than the second pitch.

BRIEF DESCRIPTION OF THE DRAWINGS

Concepts of the present invention will now be described in connection with certain non-limiting embodiments with reference to the following illustrative figures so that it may be more fully understood.

With specific reference now to the figures in detail, it is stressed that the particulars shown are by way of example and for purpose of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

FIG. 1 shows an isometric view of an example embodiment of a modular rotary cutting tool in accordance with the present invention.

FIG. 2 shows an exploded isometric view of the modular cutting tool of FIG. 1.

In the figures, equivalent parts are provided with the same reference signs.

DESCRIPTION OF EXEMPLARY EMBODIMENTS

As used herein, the term "number" shall refer to any non-zero quantity (i.e., one or any quantity greater than one).

As used herein, the term "selectively coupled" shall mean that two or more components are coupled or joined together in a manner which may be selectively undone (i.e., uncoupled) without damaging either of the components.

As used herein, the term "pitch" shall refer to the distance measured parallel to a central axis of a threaded member between corresponding points on adjacent thread forms in the same axial plane and on the same side of the axis.

FIGS. 1-5 show a modular rotary cutting tool 10 according to a first example embodiment of the invention disposed about a central longitudinal axis A. Cutting tool 10 includes a reusable shank 12 and a replaceable cutter 14, selectively coupled together by a coupling mechanism (not numbered) formed from cooperating portions of each of shank 12 and cutter 14 which are discussed in detail below. In the example embodiment shown in FIGS. 1-5, cutter 14 is in the form of an end mill formed from a carbide material, however, it is to be appreciated that another rotary cutting tool, e.g., without limitation, a face mill, rounded tip mill, slitting mill, drill, reamer, or any other replaceable tip for milling, drilling, reaming or other metal cutting applications, formed from carbide or other suitable material or materials may be employed without varying from the scope of the present invention. Shank 12 may be formed from steel, carbide or other suitable material formed in a generally cylindrical shape with a slightly stepped portion, however, it is to be appreciated that other cross-sections, shapes, and materials may also be employed without varying from the scope of the present invention. It is also to be appreciated that shank 12 may be formed as a generally solid member, as shown in the illustrated embodiment of FIG. 1-5, or may include one or more internal passages through which a flow of coolant and/or lubricant may be provided to cutter 14.

Figure 1B:
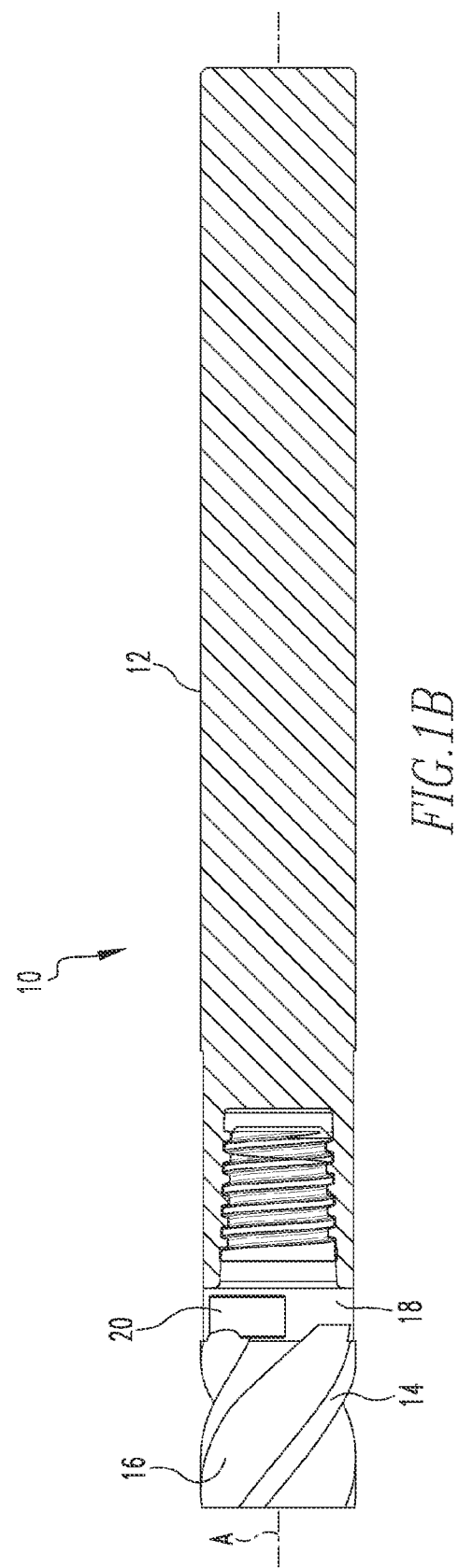
FIG. 1B shows a side view of the modular cutting tool of FIG. 1 with the shank portion shown in cross-section.

Continuing to refer to FIG. 1, the exposed portion of the cutter 14 (when installed in shank 12) may include an active fluted portion 16 structured to perform cutting operations on a workpiece (not shown), followed by a short cylindrical portion 18. The cylindrical portion 18 is preferably equipped with at least two opposing parallel flats 20 (only one visible in FIG. 1) formed therein/on, on which a standard spanner wrench (not shown) may engage for installing or removing cutter 14 from shank 12, as discussed further below.

Figure 3:
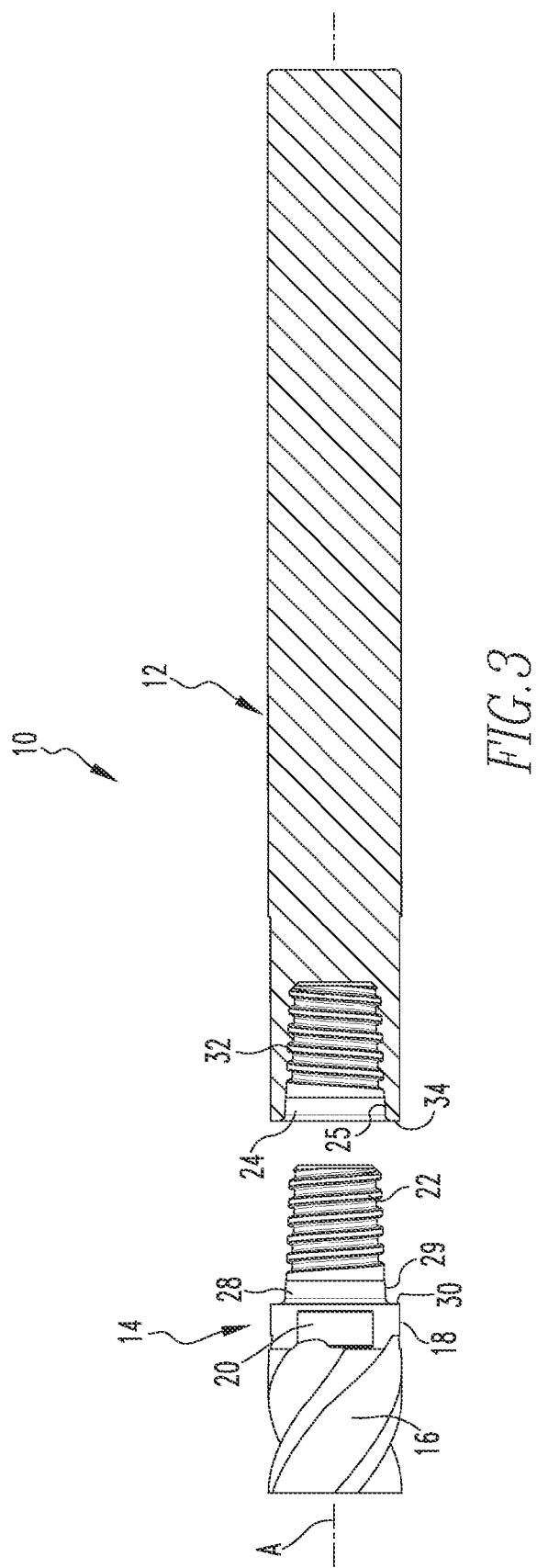
FIG. 3 shows an exploded side view of the modular cutting tool of FIG. 1 with the shank portion shown in cross-section to show internal details.
Figure 4:
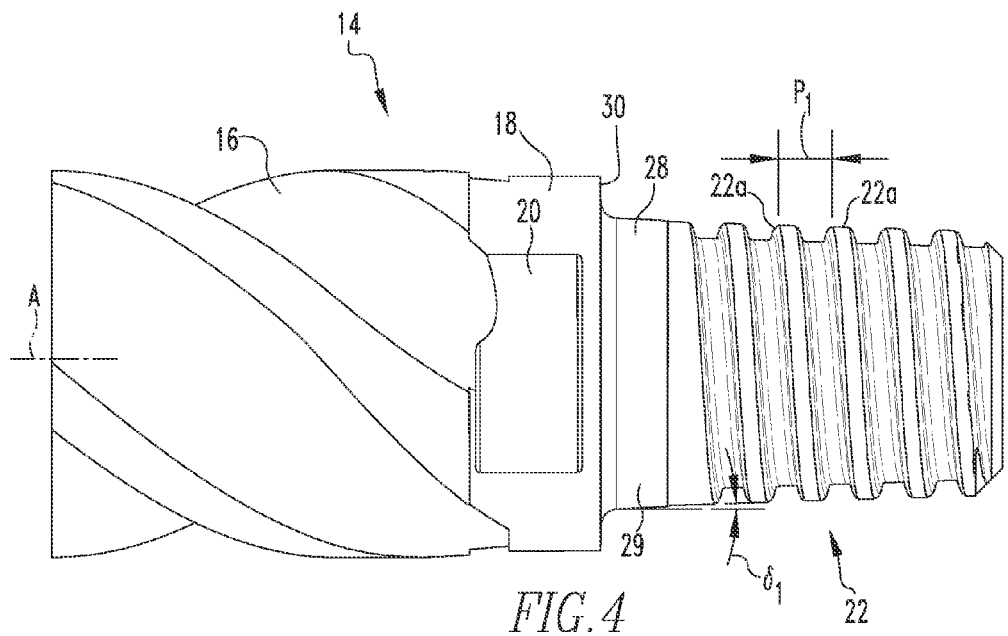
FIG. 4 shows a detail side view of the cutter portion of the rotary cutting tool of FIG. 1.
Figure 5:
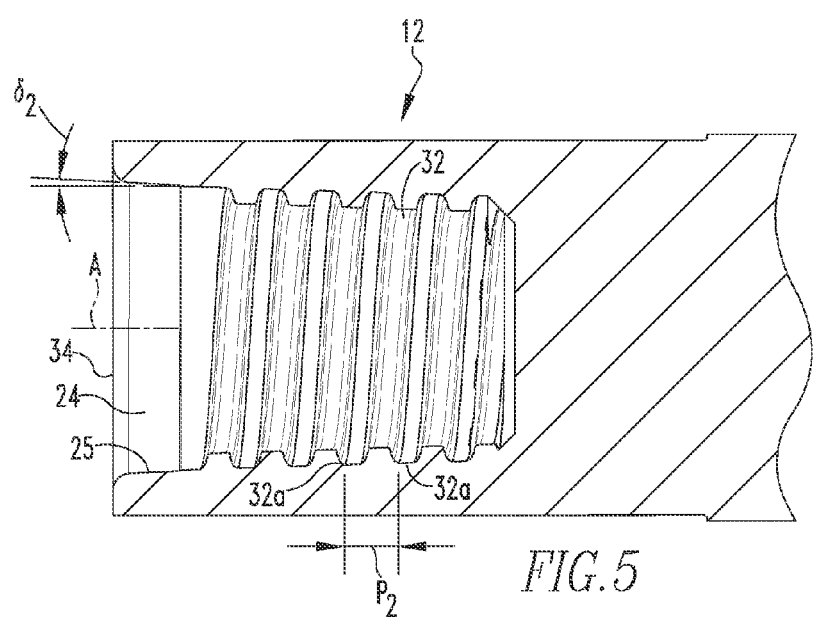
FIG. 5 shows a detail cross-sectional view of a portion of the shank portion of the rotary cutting tool of FIG. 1.

The exploded views of FIGS. 2 and 3 and detail views of FIGS. 4 and 5 show details of the portions of shank 12 and cutter 14 which form the coupling mechanism between cutter 14 and shank 12. More particularly, the coupling mechanism includes, as part of cutter 14: an outwardly protruding male threaded portion 22 extending opposite active fluted portion 16; a radial aligner portion 28 disposed concentric to the longitudinal axis A and extending between the short cylindrical portion 18 and the threaded portion 22; and a flat axial stop shoulder 30 which bridges the radial gap between the smaller diameter, radial aligner 28, and the larger diameter, short cylindrical portion 18. As shown in the illustrated example embodiment, shoulder 30 may disposed perpendicular to the longitudinal axis A. In other embodiments, shoulder 30 may be slightly inclined (up to +/−3° to a reference drawn perpendicular to the longitudinal axis A.

The coupling mechanism also includes, as part of shank 12: a generally smooth alignment bore 24 disposed concentric to longitudinal axis A, a female threaded bore 32 extending from the alignment bore 24, and an axial stop surface 34 disposed perpendicular to the longitudinal axis A at an end of shank 12 adjacent the alignment bore 24.

Referring to the detail view of cutter 14 shown in FIG. 4, the radial aligner portion 28 is formed generally as a portion of a truncated cone and includes an outward facing circumferential surface 29 disposed at an angle $\delta_1$ relative to longitudinal axis A. In example embodiments of the present invention, the angle $\delta_1$ is generally in the range of about 1° to about 7°. Alternatively, radial aligner portion 28 may be of generally cylindrical shape (i.e., $\delta_1$=0 degrees). In general, a truncated cone has been found to be preferable when the cutter 14 is coupled with steel shanks while the cylindrical shape has been found to be preferable when the cutter 14 is coupled with carbide shanks.

Referring to the cross-sectional detail view of an end portion of shank 12 shown in FIG. 5, the alignment bore 24 is formed in a generally corresponding shape to aligner portion 28. In general, the diameter of the aligner portion 28 may be slightly larger (preferred for steel shanks) or equal to (preferred for carbide shanks) than the diameter of the alignment bore 24.

As the alignment bore 24 is formed in a generally corresponding shape to aligner portion 28, in the illustrated embodiment alignment bore 24 is also formed generally as a portion of a truncated cone and includes an inward facing circumferential surface 25 disposed at an angle $\delta_2$ relative to the longitudinal axis A. As the inward facing circumferential surface 25 of shank 12 generally cooperates with the outward facing circumferential surface 29 of cutter 14, in example embodiments of the present invention, the angle $\delta_2$ generally is in the range of from about 0° to about 7° depending on the angle $\delta_1$ of the outward facing circumferential surface 29.

Referring to FIGS. 4 and 5, threaded portion 22 of cutter 14 includes a number of threads 22a, preferably at least 4 (although other numbers may be employed), disposed at a first pitch $P_1$ about longitudinal axis A and threaded bore 32 includes at least a corresponding number of female threads 32a disposed about longitudinal axis A at a second pitch $P_2$, which is different than $P_1$. In the example embodiment shown in FIGS. 1-5, the second pitch $P_2$ is greater than the first pitch $P_1$ by about 0.005 mm. By utilizing a larger pitch $P_2$ in the threaded bore 34 of the shank 12, and thus a smaller pitch $P_1$ in cutter 14, the resulting stress on threaded portion 22 of cutter 14 when coupled with shank 12 is dispersed more evenly among the threads 22a as compared to an embodiment in which cooperating threads of generally the same pitch are utilized. In example embodiments of the present invention, thread pitches varying from about 0.002-0.010 mm between the respective threads of the shank 12 and cutter 14 have been employed. In contrast to embodiments of the present invention, in instances where cooperating threads of generally the same pitch are utilized stress is generally concentrated at the thread closest to axial stop shoulder 30 due to the general inelasticity of the carbide or steel cutter 14. By more evenly distributing the stress among the threads 22a of threaded portion 22, embodiments of the present invention allow for higher loads to be applied to the connection before failure.

Assembly of the modular cutting tool assembly 10 is performed by engaging the threaded portion 22 of cutter 14 with the threaded bore 32 of the shank 12 and subsequently rotating one or both of the cutter 14 and/or shank 12 until the radial aligner portion 28 of cutter 14 is seated within the alignment bore 24 of shank 12 and the axial stop shoulder 30 of the cutter 14 abuts the axial stop surface 34 of the shank 12. The axial position of cutter 14 with respect to shank 12 is derived from the direct contact of stop shoulder 30 of cutter 14 with the axial stop surface 34 of shank 12. Once stop shoulder 30 and stop surface 34 are engaged, the coupling is preferably further tightened to a specified torque using a torque limiting wrench to avoid excessive tension of the cutter 14.

Figure 6:
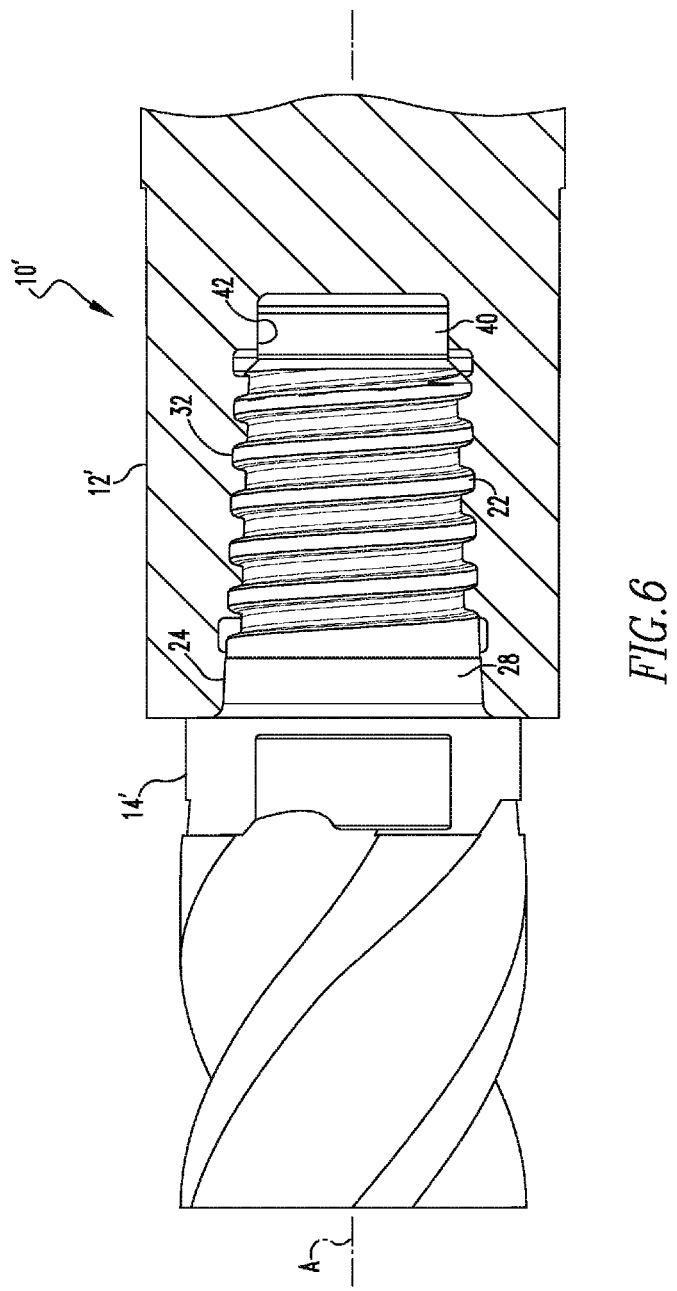
FIG. 6 shows a side view of another example embodiment of a coupling mechanism in accordance the present invention shown partially in cross-section to show internal details.

FIG. 6 shows a detail view of another embodiment of a coupling mechanism between a shank 12' (shown in cross-section) and a cutter 14' of a modular cutting tool 10'. The cutting tool 10' may be of similar outward appearance to cutting tool 10, previously described, and cutter 14' and shank 12' interact in a similar manner as cutter 14 and shank 12 aside from the inclusion of a second radial aligner portion 40 disposed adjacent threaded portion 22 opposite radial aligner portion 28. When cutter 14' is coupled with shank 12', such as shown in FIG. 6, the outward facing circumferential surface (not numbered) of the second radial aligner portion 40 engages the inward facing circumferential surface (not numbered) of a second alignment bore 42 formed in shank 12' adjacent threaded bore 32 opposite first alignment bore 24. In example embodiments of the present invention, radial aligner portion 40 is of generally similar, or slightly smaller diameter than the diameter of the second alignment bore 42. Also, the surface (not numbered) of second radial aligner portion 40 may be disposed at angles ranging from 0° to about 6° with respect to the central longitudinal axis A, while the surface (not numbered) of the second alignment bore 42 may be disposed at the same angle, or within a range of 1°-2° of the angle of the surface of the second radial aligner portion 40. Although shown having second radial aligner portion 40 in addition to radial aligner portion 28, it is to be appreciated that embodiments of the present invention may include only second radial alignment portion 40 without radial alignment portion 28.

Figure 7:
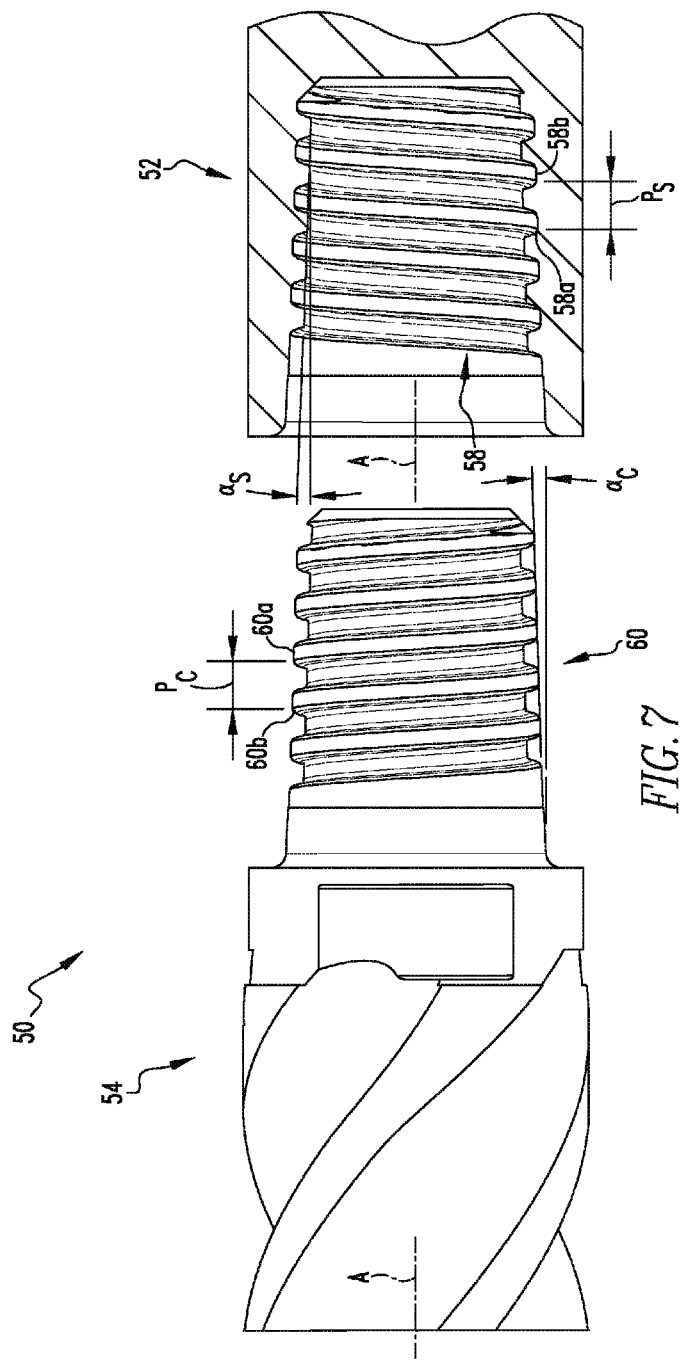
FIG. 7 shows an exploded side view of another example embodiment of a modular cutting tool in accordance with the present invention with the shank portion shown in cross-section to show internal details.

FIG. 7 shows an exploded side view of another example embodiment of a modular cutting tool 50 in accordance with the present invention which includes a shank 52 and a cutter 54 coupled via another coupling mechanism in accordance with the present invention. Shank 52 and cutter 54 may be of generally similar construction as shanks 12, 12' and cutters 14, 14' previously described and respectively include a female threaded bore 58 (including female threads 58a, 58b) and a male threaded portion 60 (including male threads 60a, 60b). However, unlike the embodiments previously discussed, in which different thread pitches on the male and female threaded portions were utilized to ditrubute stress more evenly throughout the threads when the two components were tightly threadely coupled together, the embodiment illustrated in FIG. 7 accomplishes a similar result by orienting the male and female threaded portions at different angles with respect to each other. For example, in the embodiment illustrated in FIG. 7, the threads 60a, 60b of the male threaded portion 60 are disposed at a first taper angle $\alpha_C$ (measured with respect to a reference disposed parallel to the central longitudinal axis A) while the threads 58a, 58b of the female threaded bore 58 are disposed at a second taper angle $\alpha_S$ (measured with respect to a reference disposed parallel to the central longitudinal axis A). More particularly, by disposing the female threads 58a, 58b at a second taper angle $\alpha_S$ greater than the first taper angle $\alpha_C$ of the male threads 60a, 60b, a spatial relationship between the male and female threaded portions 58, 60 similar to that created by the use of different thread pitches as previously discussed is created even when the thread pitches $P_S$ and $P_C$ are the same. It is to be appreciated that such embodiment could also be utilized with different thread pitches $P_S$ and $P_C$ as an alternative to being used with portions having the same pitch.

Although in the particular embodiments described herein the shank is provided with a threaded bore for engaging a complementary male thread on the cutter, the reverse is also possible whereby the shank is provided with a protruding male threaded portion, and the cutter is provided with an internally threaded bore.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be tip embraced therein.

What is claimed is:

1. A rotary cutting tool comprising:
   a cutter of generally cylindrical shape disposed about a central longitudinal axis, the cutter having a first end having an active fluted portion and an opposite second end, the second end having a male threaded portion disposed thereabout; and
   a shank of generally cylindrical shape disposed about the central longitudinal axis, the shank having a recessed female threaded portion formed in a first end;
   wherein the male threaded portion includes a number of threads disposed at a first pitch and the female threaded portion includes a number of threads disposed at a second pitch different than the first pitch;
   wherein the difference between the first pitch and the second pitch is in the range of about 0.002 to about 0.010 mm;
   the second pitch being generally constant along the female threaded portion;
   the first pitch being generally constant along the male threaded portion;
   wherein the cutter includes an axial stop shoulder and the shank includes an axial stop surface;
   wherein, in an assembled state:
   the cutter and the shank are selectively coupled via threaded engagement of the male threaded portion and the female threaded portion; and
   the axial stop shoulder of the cutter abuts the axial stop surface of the shank;
   wherein the male threaded portion includes a thread closest to the axial stop shoulder; and
   in the assembled state, stress concentration at the thread closest to the axial stop shoulder is avoided.

2. The rotary cutting tool of claim 1 wherein the first pitch is less than the second pitch.

3. The rotary cutting tool of claim 2 wherein the first pitch is about 0.005 mm less than the second pitch.

4. The rotary cutting tool of claim 1 wherein the cutter is formed from a carbide material and wherein the shank is formed from a tool steel.

5. The rotary cutting tool of claim 1 wherein:
   the cutter comprises an outward facing circumferential surface having an outward dimension and extending a distance along the central longitudinal axis disposed between the active fluted portion and the male threaded portion;
   the shank comprises an inward facing circumferential surface having an inward dimension and extending a distance along the central longitudinal axis between the female threaded portion and the first end of the shank; and
   the outward facing circumferential surface is disposed adjacent to, and faces, the inward facing circumferential surface when the male threaded portion and the female threaded portion are threadedly engaged;
   the cutter being formed from a cutter carbide material and the shank being formed from a shank carbide material;
   wherein the outward dimension is about equal to the inward dimension.

6. The rotary cutting tool of claim 5, wherein the outward facing circumferential surface is generally in the form of a portion of a truncated cone disposed at a first angle with respect to the central longitudinal axis, and wherein the inward facing circumferential surface is generally in the form of a portion of a truncated cone disposed at a second angle with respect to the central longitudinal axis.

7. The rotary cutting tool of claim 6 wherein the first angle is in the range of about 1° to about 7°.

8. The rotary cutting tool of claim 7 wherein the second angle is in the range of about 1° to about 7°.

9. The rotary cutting tool of claim 5, wherein the outward facing circumferential surface is generally a cylindrical surface disposed parallel to the central longitudinal axis, and wherein the inward facing circumferential surface is generally a cylindrical surface disposed parallel to the central longitudinal axis.

10. The rotary cutting tool of claim 1 wherein:
   the cutter comprises an outward facing circumferential surface extending a distance along the central longitudinal axis disposed adjacent the male threaded portion and opposite the active fluted portion;
   the shank comprises an inward facing circumferential surface extending a distance along the central longitudinal axis adjacent the female threaded portion opposite the first end of the shank; and
   the outward facing circumferential surface is disposed adjacent to, and faces the inward facing circumferential surface when the male threaded portion and the female threaded portion are threadedly engaged.

11. The rotary cutting tool of claim 10 wherein the outward facing circumferential surface is disposed at an angle in the range of 0° to about 6° with respect to the central longitudinal axis.

12. The rotary cutting tool of claim 11 wherein the inward facing circumferential surface is disposed within the range of 0° to 2° of the angle of the outward facing circumferential surface.

13. The rotary cutting tool of claim 1 wherein:
the cutter comprises a first outward facing circumferential surface extending a distance along the central longitudinal axis disposed between the active fluted portion and the male threaded portion and a second outward facing generally cylindrical circumferential surface extending a distance along the central longitudinal axis adjacent the male threaded portion and opposite the active fluted portion;
the shank comprises a first inward facing circumferential surface extending a distance along the central longitudinal axis between the female threaded portion and the first end of the shank and a second inward facing generally cylindrical circumferential surface extending a distance along the central longitudinal axis adjacent the female threaded portion opposite the first end of the shank;
the first outward facing circumferential surface is disposed adjacent to, and faces, the first inward facing circumferential surface when the male threaded portion and the female threaded portion are threadedly engaged; and
the second outward facing generally cylindrical circumferential surface is disposed adjacent to, and faces, the second inward facing generally cylindrical circumferential surface when the male threaded portion and the female threaded portion are threadedly engaged;
the second outward facing generally cylindrical circumferential surface having a second outward dimension, the second inward facing generally cylindrical circumferential surface having a second inward dimension;
the second outward dimension being equal to or less than the second inward dimension.

14. A rotary cutting tool comprising:
a cutter of generally cylindrical shape disposed about a central longitudinal axis, the cutter having a first end having an active fluted portion and an opposite second end, the second end having a male threaded portion disposed thereabout; and
a shank of generally cylindrical shape disposed about the central longitudinal axis, the shank having a recessed female threaded portion formed in a first end;
wherein the male threaded portion includes a number of threads disposed at a first pitch and at a first taper angle;
wherein the female threaded portion includes a number of threads disposed at a second pitch and at a second taper angle different than the first taper angle;
wherein the second pitch is different from the first pitch;
wherein the difference between the first pitch and the second pitch is in the range of about 0.002 to about 0.010 mm;
the second pitch being generally constant along the female threaded portion;
the first pitch being generally constant along the male threaded portion;
wherein the cutter includes an axial stop shoulder and the shank includes an axial stop surface;
wherein, in an assembled state:
the cutter and the shank are selectively coupled via threaded engagement of the male threaded portion and the female threaded portion; and
the axial stop shoulder of the cutter abuts the axial stop surface of the shank;
wherein the male threaded portion includes a thread closest to the axial stop shoulder; and
in the assembled state, stress concentration at the thread closest to the axial stop shoulder is avoided.

15. The rotary cutting tool of claim 14 wherein the first taper angle is less than the second taper angle.

16. The rotary cutting tool of claim 14 wherein the first pitch is less than the second pitch.

17. The rotary cutting tool of claim 1 wherein:
the cutter comprises an outward facing circumferential surface having an outward dimension and extending a distance along the central longitudinal axis disposed between the active fluted portion and the male threaded portion;
the shank comprises an inward facing circumferential surface having an inward dimension and extending a distance along the central longitudinal axis between the female threaded portion and the first end of the shank; and
the outward facing circumferential surface is disposed adjacent to, and faces, the inward facing circumferential surface when the male threaded portion and the female threaded portion are threadedly engaged;
the cutter formed being from a carbide material and the shank formed from a tool steel material;
wherein the outward dimension is greater than the inward dimension.

18. The rotary cutting tool of claim 1, wherein:
the cutter includes a radial aligner portion and the shank includes an alignment bore; and
in the assembled state, the radial aligner portion of the cutter is seated within the alignment bore of the shank.

* * * * *